United States Patent
Koizumi et al.

(10) Patent No.: US 9,735,659 B2
(45) Date of Patent: Aug. 15, 2017

(54) ELECTRIC ROTATING MACHINE HAVING A THERMISTOR IN A GAP BETWEEN U-SHAPED AND ODD-SHAPED COIL ENDS

(71) Applicant: Hitachi Automotive Systems, Ltd., Hitachinaka-shi, Ibaraki (JP)

(72) Inventors: Takayuki Koizumi, Hitachinaka (JP); Keiji Oda, Hitachinaka (JP); Shinichi Koyama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 170 days.

(21) Appl. No.: 14/439,109

(22) PCT Filed: Oct. 9, 2013

(86) PCT No.: PCT/JP2013/077408
§ 371 (c)(1),
(2) Date: Apr. 28, 2015

(87) PCT Pub. No.: WO2014/069191
PCT Pub. Date: May 8, 2014

(65) Prior Publication Data
US 2015/0295477 A1  Oct. 15, 2015

(30) Foreign Application Priority Data

Oct. 29, 2012  (JP) .................................. 2012-238132

(51) Int. Cl.
*H02K 11/00* (2016.01)
*H02K 3/12* (2006.01)
(Continued)

(52) U.S. Cl.
CPC .......... *H02K 11/0047* (2013.01); *H02K 3/12* (2013.01); *H02K 3/48* (2013.01); *H02K 11/25* (2016.01);
(Continued)

(58) Field of Classification Search
CPC ........ H02K 11/25; H02K 11/26; H02K 11/27; H02K 3/00; H02K 3/02; H02K 3/04;
(Continued)

(56) References Cited

U.S. PATENT DOCUMENTS 2,471,840 A * 5/1949 Seely ..................... G01K 5/323
 310/68 C
4,188,553 A * 2/1980 Wheaton ............ H01H 37/5436
 310/68 C
(Continued)

FOREIGN PATENT DOCUMENTS

JP 63-249445 A 10/1988
JP 6-70510 A 3/1994
(Continued)

OTHER PUBLICATIONS

Translation of Takasaki JP 2007043873 from JPO.*
(Continued)

*Primary Examiner* — Michael Andrews
*Assistant Examiner* — Maged Almawri
(74) *Attorney, Agent, or Firm* — Crowell & Moring LLP

(57) ABSTRACT

An electric rotating machine includes a rotor, a stator, and a thermistor. The thermistor has a temperature measuring element portion that is fitted in a minute gap defined by connecting portions of segment conductors at a stator coil end. The stator coil end is formed by arranging a plurality of the segment conductors in slots of a stator core to thereby form connecting portions of the segment conductors at the end portion of the stator core. The thermistor is separated from the connecting portions of the segment conductors only by dead air that defines the minute gap.

4 Claims, 8 Drawing Sheets

(51) Int. Cl.
*H02K 3/48* (2006.01)
*H02K 11/25* (2016.01)
*H02K 3/02* (2006.01)
*H02K 3/00* (2006.01)
*H02K 3/50* (2006.01)

(52) U.S. Cl.
CPC .............. *H02K 3/00* (2013.01); *H02K 3/02* (2013.01); *H02K 3/50* (2013.01)

(58) Field of Classification Search
CPC .. H02K 3/12; H02K 3/14; H02K 3/24; H02K 3/48; H02K 3/50; H02K 11/0047
USPC .................. 310/68 C, 180–208; 29/596, 598
See application file for complete search history.

(56) References Cited

U.S. PATENT DOCUMENTS

| | | | | |
|---|---|---|---|---|
| 4,571,518 | A * | 2/1986 | Kintz, Jr. | H02K 11/25 310/68 C |
| 5,343,613 | A * | 9/1994 | Kintz | H02K 11/25 29/596 |
| 6,285,105 | B1 * | 9/2001 | Asao | H02K 3/28 310/179 |
| 6,750,582 | B1 * | 6/2004 | Neet | H02K 3/24 310/201 |
| 6,791,228 | B2 * | 9/2004 | Hashiba | H02K 3/12 310/180 |
| 8,082,653 | B2 * | 12/2011 | Akimoto | H02K 3/28 29/596 |
| 8,519,583 | B2 * | 8/2013 | Sakaue | H02K 3/28 310/184 |
| 2003/0117033 | A1 * | 6/2003 | Even | H02K 3/12 310/180 |
| 2004/0190207 | A1 * | 9/2004 | Hoppe | G01K 5/48 361/25 |
| 2005/0248229 | A1 * | 11/2005 | Even | H02K 3/28 310/180 |
| 2006/0001326 | A1 * | 1/2006 | Even | H02K 15/0056 310/179 |
| 2006/0163959 | A1 * | 7/2006 | Ogawa | H02K 3/38 310/71 |
| 2009/0140596 | A1 * | 6/2009 | Kaiser | H02K 3/12 310/201 |
| 2012/0086292 | A1 * | 4/2012 | Ishida | H02K 11/25 310/71 |
| 2012/0112580 | A1 * | 5/2012 | Sato | H02K 3/522 310/71 |
| 2012/0200191 | A1 * | 8/2012 | Baba | H02K 3/12 310/201 |
| 2013/0069474 | A1 * | 3/2013 | Hamer | H02K 3/34 310/208 |
| 2013/0187494 | A1 * | 7/2013 | Hamer | H02K 15/0081 310/71 |

FOREIGN PATENT DOCUMENTS

| | | | |
|---|---|---|---|
| JP | 2007043873 A | * | 2/2007 |
| JP | 2007-89295 A | | 4/2007 |
| JP | 2011-112563 A | | 6/2011 |
| JP | 2011223673 | * | 7/2011 |
| JP | 2011-223673 A | | 11/2011 |

OTHER PUBLICATIONS

JP2011223673 English Translation.*
International Search Report (PCT/ISA/210) dated Jan. 14, 2014, with English translation (Five (5) pages).
Japanese language Written Opinion (PCT/ISA/237) dated Jan. 14, 2014 (Four (4) pages).

* cited by examiner (A)

(B)

ELECTRIC ROTATING MACHINE HAVING A THERMISTOR IN A GAP BETWEEN U-SHAPED AND ODD-SHAPED COIL ENDS

TECHNICAL FIELD

The present invention relates to electric rotating machines and in particular to an electric rotating machine that is suitable to measure the temperature of a stator winding.

BACKGROUND ART

As a method of attaching a thermistor that measures the temperature of a stator winding of an electric rotating machine is known a method which is described in e.g. patent document 1. Patent document 1 discloses an electric rotating machine that has the following features. This electric rotating machine includes an annular stator core; a plurality of slot portions formed in the stator core; a plurality of rectangular wires wound around the plurality of slot portions according to a predetermined winding method to form a coil portion, each of the rectangular wires having a rectangle in cross-section; a coil end portion formed as a portion from which the plurality of rectangular wires project to an axial end face of the stator core, the coil end portion being such that the plurality of rectangular wires are arranged parallel to each other along the circumferential direction of the stator core with one flat surface of the rectangular cross-section of the rectangular wire being parallel to an end face of the stator core; and a temperature sensor disposed at the coil end portion. The coil end portion has a parallel separate-wall space that is formed by further more projecting, of the plurality of rectangular wires arranged parallel to each other along the circumferential direction of the stator core, two rectangular wires arranged with an interval spaced apart from each other in the radial direction of the stator core than the other rectangular wires arranged in the interval. The temperature sensor is received and disposed in the separate-wall space of the coil end.

PRIOR ART DOCUMENT

Patent Document

Patent document 1: JP-2011-223673-A

SUMMARY OF THE INVENTION

Problem to be Solved by the Invention

The temperature measuring element portion of a thermistor is generally received in the gap between stator windings at a stator coil end of the stator windings.

However, the temperature measuring element portion of the thermistor has low mechanical strength; therefore, it is generally protected with a tube or resin. Hybrid vehicles have actively been developed in order to avoid a recent problem such as global warming. In the hybrid vehicles, an electric rotating machine which drives the vehicle may be mounted in a transmission. In this case, the electric rotating machine is exposed to an automatic transmission field (ATF). Therefore, also to ensure oil resistance, the temperature measuring element portion of the thermistor is covered by means of some kind of protecting member in many cases.

The temperature measuring element portion of the thermistor has some degree of size; therefore, it is not easy for the temperature measuring element portion of the thermistor to be fitted into a gap between the stator windings.

In a stator composed of stator windings of distributed winding, the stator winding has a small wire-diameter; therefore, the stator coil end has low rigidity and thus the stator coil end can be formed with a gap adapted to receive the temperature measuring element portion of the thermistor to be inserted into windings. In a stator composed of stator windings of segment conductors, in general, the stator winding has a large wire-diameter or is made of a rectangular wire. Therefore, the stator coil end and the stator windings forming the stator coil end have high rigidity. Thus, a gap adapted to receive the temperature measuring element portion of the thermistor inserted thereinto cannot be formed.

Because of these factors, in the stator composed of the segment conductor stator windings, the temperature measuring element portion of the thermistor is generally installed so as to hug the stator winding on the front surface of the stator coil end and is secured thereto with a lacing string or an adhesive. For this attachment method, since the temperature measuring element portion of the thermistor is not fully surrounded by the stator windings that produce heat, there is a possibility that the thermistor has low temperature detection accuracy and also ability to follow up a sudden change in the temperature of the stator winding gets worse. In addition, a contact condition varies between the temperature measuring element portion of the thermistor and the stator winding; therefore, there is a concern for an increased variation in the detected temperature of each stator.

Also in the attachment method disclosed in patent document 1, the temperature measuring element portion of the thermistor is installed so as to hug the surface of the stator coil end of the stator winding. Therefore, although the temperature measuring element portion of the thermistor is surrounded from three sides, one side thereof is exposed to the outside of the stator winding. Thus, it is expected that the temperature detection accuracy of the thermistor is low and also ability to follow up a sudden change in the temperature of the stator winding is poor. It is presumed that after the temperature measuring element portion of the thermistor is installed at the stator coil end, it has to be secured with a lacing string or an adhesive.

In short, these conventional thermistor attachment methods have problems in that the temperature detection accuracy of the thermistor is low, ability to follow up a sudden change in the temperature of the stator winding is poor and variations in the detection temperatures of the stators are likely to occur.

It is an object of the present invention to provide an electric rotating machine that is improved in the temperature detection accuracy of a thermistor and that is improved in ability to follow up a sudden change in the temperature of a stator winding.

Means for Solving the Problem

To achieve the above object, the present invention is an electric rotating machine that comprises: a rotor mounted on a rotating shaft rotatably supported; and a stator disposed around an outer circumference of the rotor via a minute clearance between the rotor and the stator, the stator including a stator core having a plurality of slots formed in a circumferential direction, a stator winding formed by connecting a plurality of segment conductors inserted into the slots of the stator core, and a thermistor for measuring the temperature of the stator winding, and the stator winding including slot portions received in the slots, and connecting portions each of which connects end portions of the slot portions. In the electric rotating machine, a temperature measuring element portion of the thermistor is fitted in a minute gap sandwiched among the connecting portions of the segment conductors at a stator coil end, the stator coil end being formed by arranging a plurality of the segment conductors in the slots of the stator core to thereby form the connecting portions of the segment conductors at the end portion of the stator core.

With the configuration as above, the temperature detection accuracy of the thermistor can be improved and ability to follow up a sudden change in the temperature of the stator winding can be improved.

Effects of the Invention

The present invention can improve the temperature detection accuracy of the thermistor and the ability to follow up a sudden change in the temperature of the stator winding.

MODE FOR CARRYING OUT THE INVENTION

A configuration of an electric rotating machine according to one embodiment of the present invention will hereinafter be described with reference to FIGS. 1 to 6.

The overall configuration of the electric rotating machine according to the present embodiment is first described with reference to FIG. 1.

Figure 1:
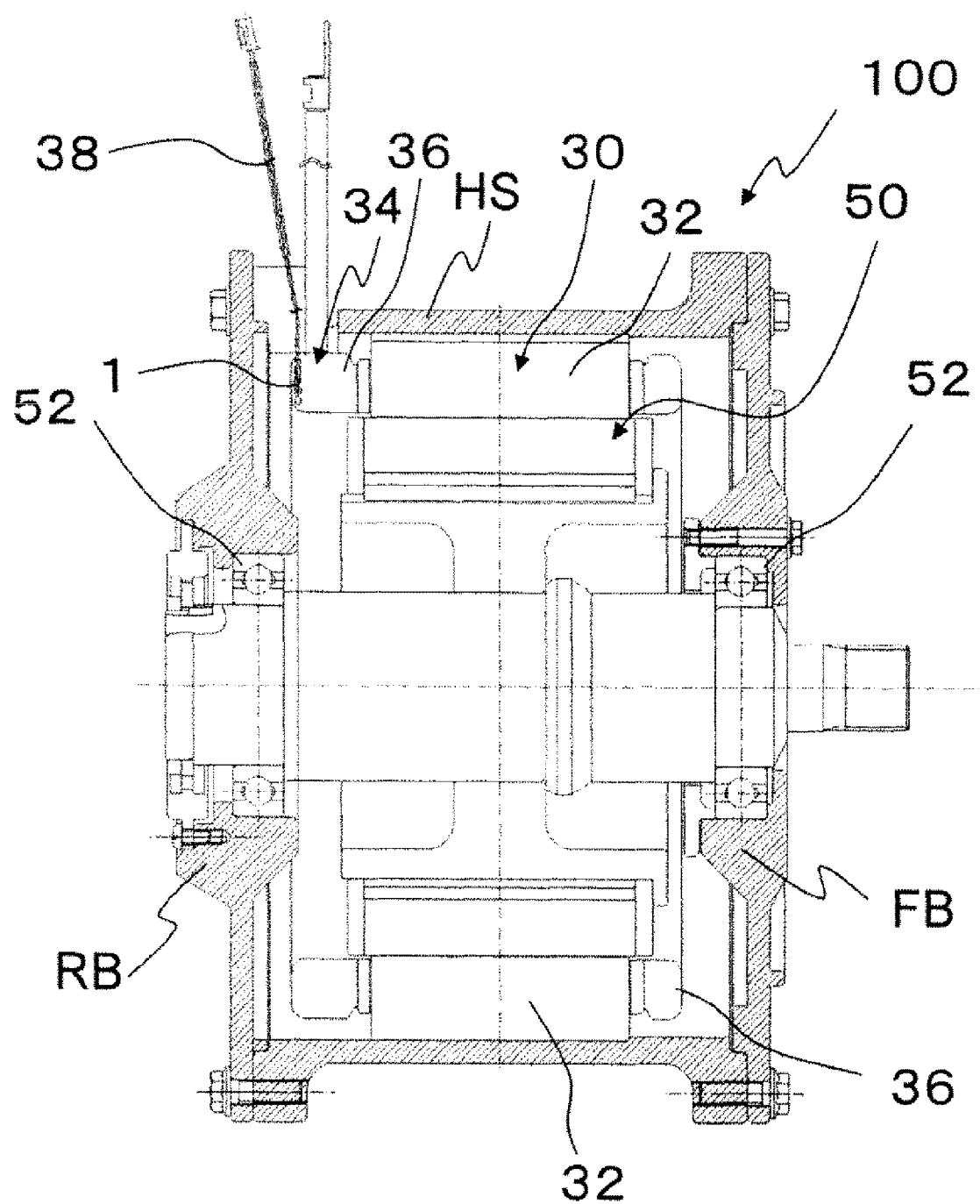
FIG. 1 is a cross-sectional view illustrating the overall configuration of an electric rotating machine according to one embodiment of the present invention.

FIG. 1 is a cross-sectional view illustrating the overall configuration of the electric rotating machine according to one embodiment of the present invention.

An electric rotating machine 100 includes a rotor 50 mounted on a rotating shaft supported for rotation by bearings 52 and a stator 30 disposed around the outer circumference of the rotor 50 via a minute clearance between the rotor 50 and the stator 30. One of the two bearings 52 is mounted to a front bracket FB and the other is mounted to a rear bracket RB. The front bracket FB is secured to one open end of a cylindrical housing HS and the rear bracket RB is secured to the other open end of the housing HS. The stator 30 is secured to the inner circumferential side of the housing HS.

The stator 30 includes a stator core 32 having a plurality of slots formed in a circumferential direction; a stator winding 34 composed of segment conductors; and a thermistor 38 to measure the temperature of the stator winding 34. A temperature measuring element portion 1 of the thermistor 38 is attached to a stator coil end 36 of the stator winding 34.

The configuration of the stator used in the electric rotating machine according to the present embodiment is described with reference to FIGS. 2 to 6.

Figure 2:
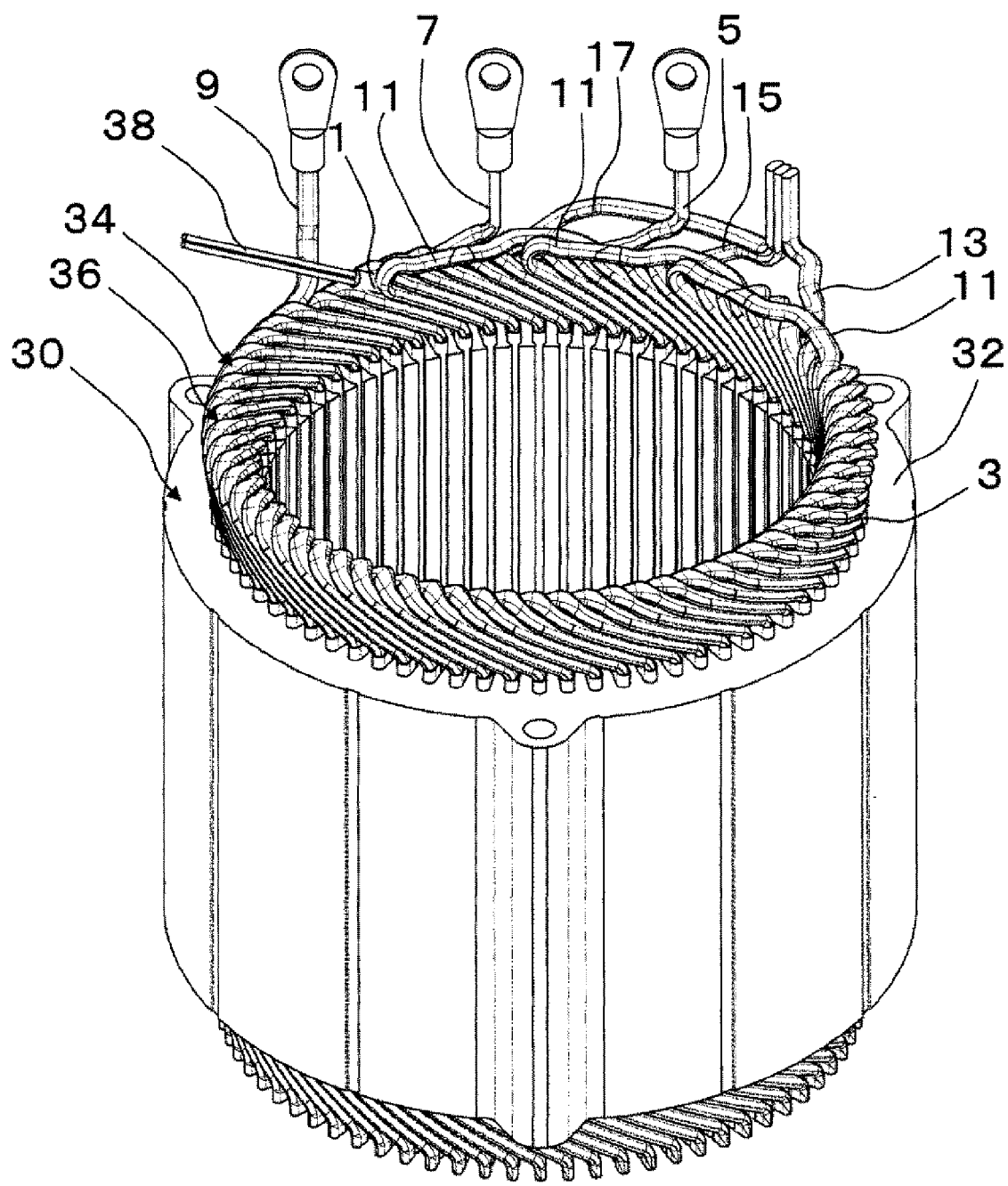
FIG. 2 is a perspective view illustrating a configuration of a stator used in the electric rotating machine according to one embodiment of the present invention.
Figure 3:
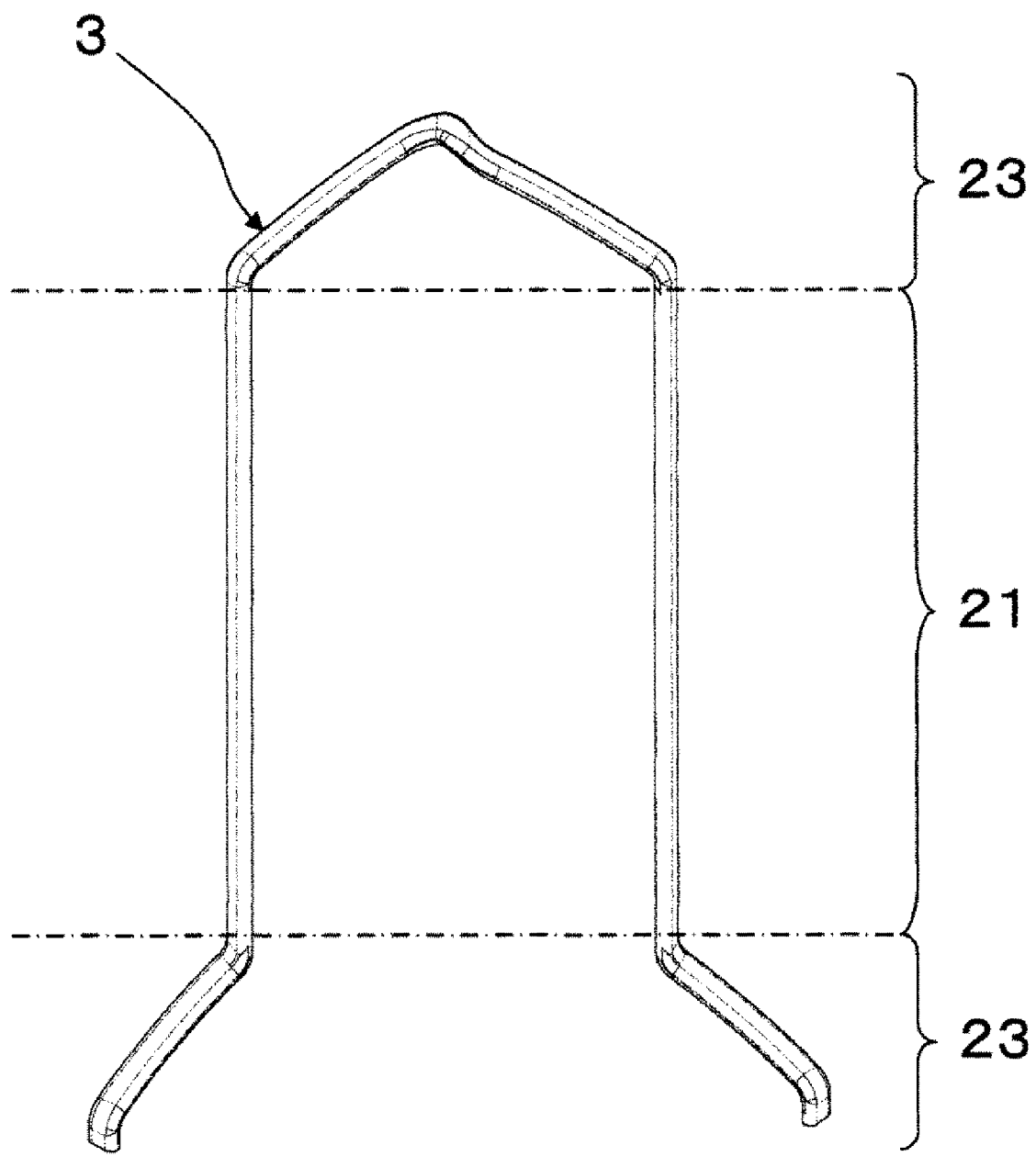
FIG. 3 is a front view illustrating a configuration of a U-shaped segment conductor used in the stator of the electric rotating machine according to one embodiment of the present invention.
Figure 4:
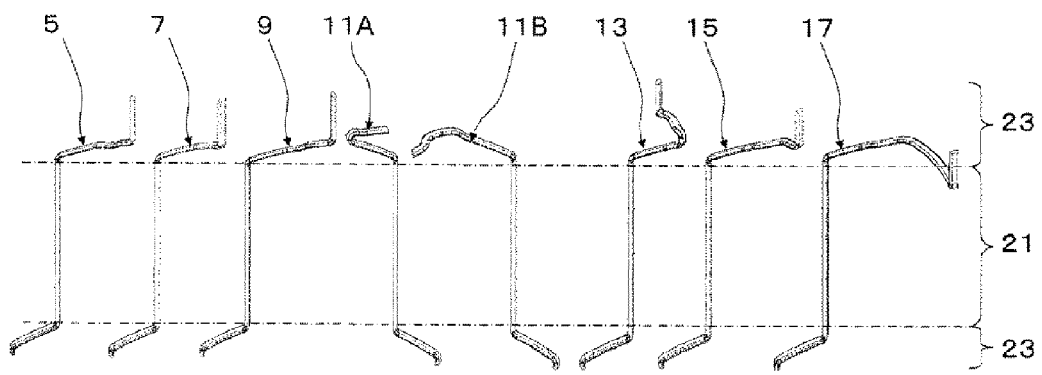
FIG. 4 is a front view illustrating configurations of odd-shaped segment conductors used in the stator of the electric rotating machine according to one embodiment of the present invention.
Figure 5:
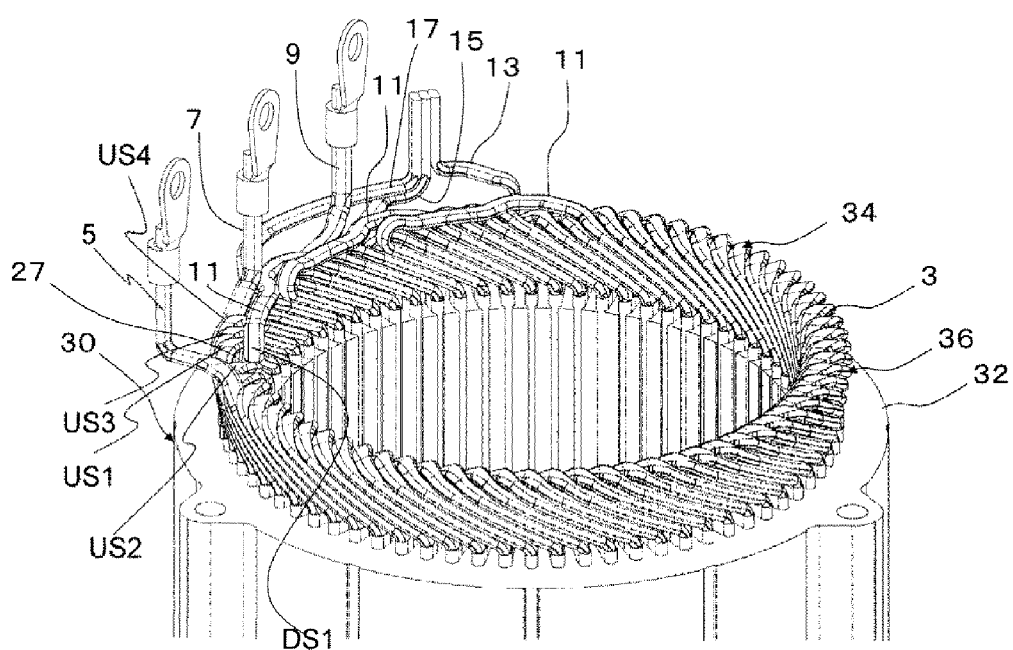
FIG. 5 is a partial enlarged perspective view illustrating a configuration of the stator used in the electric rotating machine according to one embodiment of the present invention.
Figure 6:
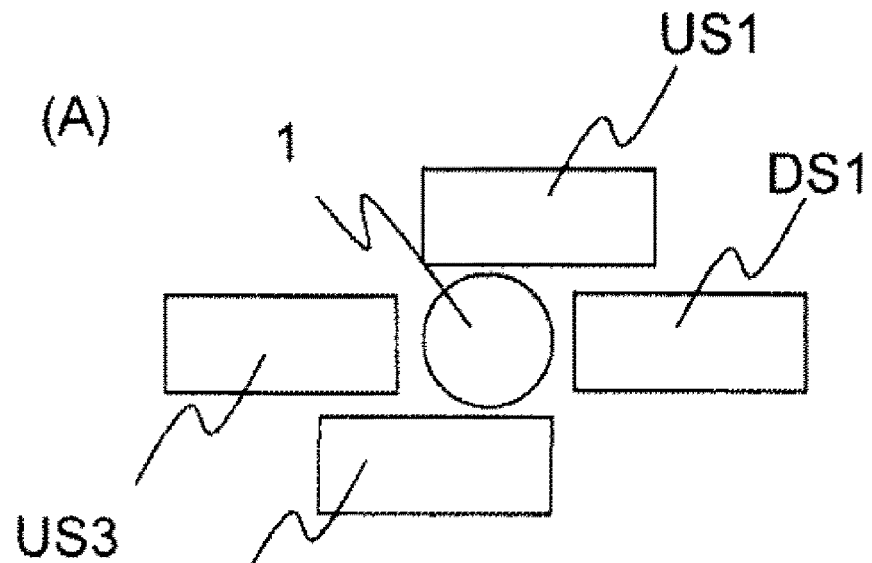
FIG. 6 is a cross-sectional view illustrating a configuration of an essential part of the stator used in the electric rotating machine according to one embodiment of the present invention.
Figure 6:
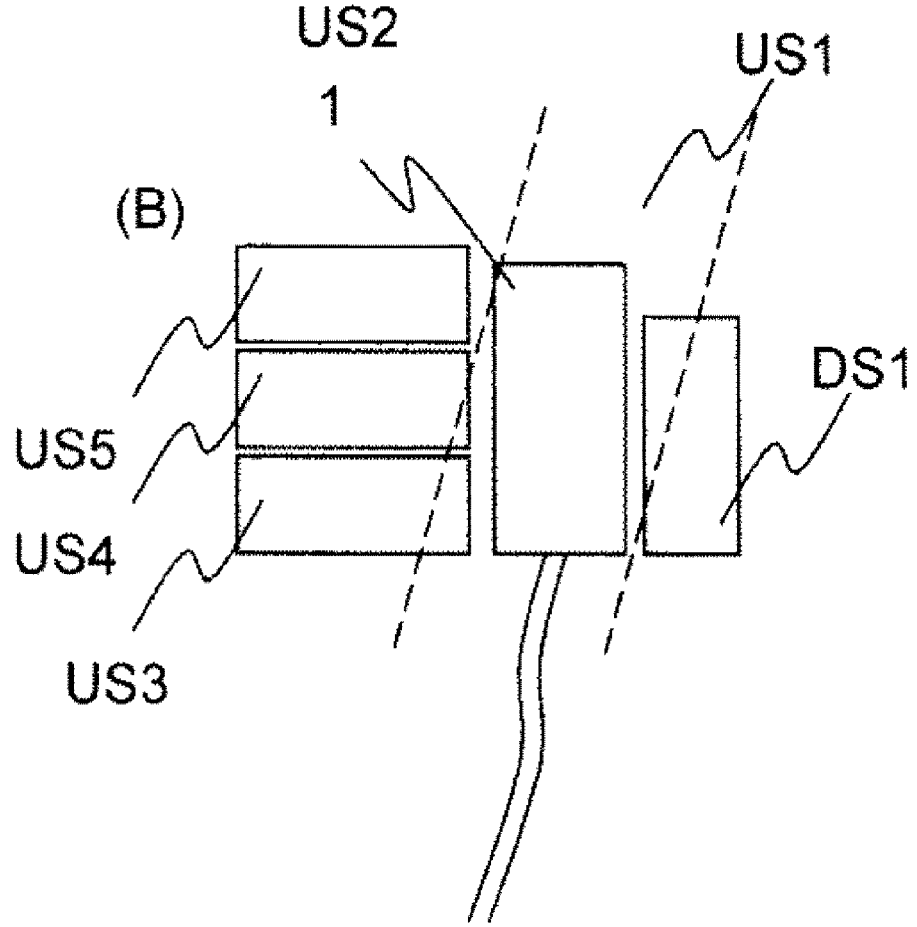

FIG. 2 is a perspective view illustrating the configuration of the stator used in the electric rotating machine according to one embodiment of the present invention. FIG. 3 is a front view illustrating the configuration of a U-shaped segment conductor used in the stator of the electric rotating machine according to one embodiment of the present invention. FIG. 4 is a front view illustrating the configurations of odd-shaped segment conductors used in the stator of the electric rotating machine according to one embodiment of the present invention. FIG. 5 is a partial enlarged perspective view illustrating the stator used in the electric rotating machine according to one embodiment of the present invention. FIG. 6 is a cross-sectional view illustrating a configuration of an essential part of the stator used in the electric rotating machine according to one embodiment of the present invention. Incidentally, the same reference numerals as in FIG. 1 denote like portions in each of the drawings.

As illustrated in FIG. 2, the stator 30 includes the stator core 32 having a plurality of the slots formed in the circumferential direction; the stator winding 34 composed of segment conductors; and the thermistor 38 to measure the temperature of the stator winding 34. The temperature measuring element portion 1 of the thermistor 38 is fitted in a minute gap of the stator coil end 36 of the stator winding 34.

The stator winding 34 is configured by connecting the U-shaped segment conductors 3 each formed into a general U-shape and odd-shaped segment conductors 5, 7, 9, 11, 13, 15, 17 having shapes different from those of the U-shaped segment conductors.

As illustrated in FIG. 3, the U-shaped segment conductor 3 includes slot portions 21 received in two separate slots in the stator core 32 illustrated in FIG. 2 and connecting portions 23 connecting the slot portions 21 with each other at the end portions thereof. The U-shaped segment conductor 3 is formed into a general U-shape.

As illustrated in FIG. 4, the odd-shaped segment conductors 5, 7, 9, 11A, 11B, 13, 15, 17 are each composed of: a slot portion 21 received in one of the slots which separates from the other one of the slots, in which the other slot portion of one of the other odd-shaped segment conductors is received in the stator core 32 illustrated in FIG. 2; and connecting portions 23 each used for, from the end portion of the respective slots, connecting to U-, V- or W-lead terminals, neutral points or transition portions. The odd-shaped segment conductors 5, 7, 9, 11A, 11B, 13, 15, 17 have shapes different from those of the U-shaped segment conductors and are crank-shaped segment conductors as illustrated.

The odd-shaped segment conductor 11A and the odd-shaped segment conductor 11B are connected to each other at their upper ends illustrated in the figure and are used as the odd-shaped segment conductor 11 illustrated in FIG. 2. Therefore, as with the odd-shaped segment conductor 11A and the odd-shaped segment conductor 11B illustrated in FIG. 4, they may be formed as two members and then connected to each other at their end portions. Alternatively, the odd-shaped segment conductor 11A and the odd-shaped segment conductor 11B may be configured as one member shaped such that both have previously been connected to each other.

As illustrated in FIG. 2, a plurality of the U-shaped segment conductors 3 and of the odd-shaped segment conductors 5, 7, 9, 11, 13, 15, 17 are arranged in the corresponding slots of the stator core 32 in the present embodiment. The connecting portions 23 of the U-shaped segment conductors 3 and the connecting portions 23 of the odd-shaped segment conductors 5, 7, 9, 13, 15, 17 are arranged at the end portion of the stator core 32 to form the stator coil end 36.

The stator of the electric rotating machine illustrated in FIG. 2 is of three-phases. The stator windings are star-connected. The stator winding of each phase is composed of two windings, both of which are connected in series.

If the stator core 32 illustrated in FIG. 2 has 72 slots, 72 of the U-shaped segment conductors 3 illustrated in FIG. 3 are used. The odd-shaped segment conductors 5, 7, 9 illustrated in FIG. 4 are used as U-, V- and W-lead terminals of three phases; therefore, they are used one by one. The odd-shaped segment conductors 11A, 11B, which serve as the odd-shaped segment conductor 11, are used as transition portions for two-series configuration for each phase. Thus, three of the odd-shaped segment conductors 11A and three of the odd-shaped segment conductors 11B are used. The odd-shaped segment conductors 13, 15, 17 are used as neutral points; therefore, they are used one by one.

As illustrated in FIG. 5, an opening 27 inevitably exists among the U-shaped segment conductors 3 and the odd-shaped segment conductor 11 in the stator coil end 36. The opening 27 exists not only among the U-shaped segment conductors 3 and the odd-shaped segment conductor 11 but also among the U-shaped segment conductors 3 and the odd-shaped segment conductor 5, among the U-shaped segment conductors 3 and the odd-shaped segment conductor 7, among the U-shaped segment conductors 3 and the odd-shaped segment conductor 9, among the U-shaped segment conductors 3 and the odd-shaped segment conductor 13, among the U-shaped segment conductors 3 and the odd-shaped segment conductor 15, and among the U-shaped segment conductors 3 and the odd-shaped segment conductor 17.

The temperature measuring element portion 1 of the thermistor is inserted into the stator coil end 36 from the opening 27 defined among the U-shaped segment conductors 3 and the odd-shaped segment conductor 11 adjacent thereto. In addition, as illustrated in FIG. 2, the temperature measuring element portion 1 of the thermistor is fitted in a minute gap put among the connecting portions 23 of the U-shaped segment conductors 3 and the connecting portion 23 of the odd-shaped segment conductor 11 in the stator coil end 36.

FIG. 6 is a cross-sectional view taken along a position of the temperature measuring element portion 1 of the thermistor. The temperature measuring element portion 1 has a cylindrical shape. FIG. 6(A) is a cross-sectional view taken along a plane perpendicular to the central axis of the cylindrical shape of the temperature measuring element portion 1. FIG. 6(B) is a cross-sectional view taken along a plane including the central axis of the cylindrical shape of the temperature measuring element portion 1.

The segment conductor denoted by symbol DS1 is the odd-shaped segment conductor 11 illustrated in FIG. 5. The correspondence relationship between the FIG. 5 and FIG. 6 is clearly specified by attaching symbol DS1 to FIG. 5. In addition, symbols US1, US2, US3, US4 denote the U-shaped segment conductors 3 illustrated in FIG. 5. The correspondence relationship between FIG. 5 and FIG. 6 is clearly specified by attaching symbols US1, US2, US3 and US4 to FIG. 5.

As seen from FIGS. 6(A) and 6(B), the temperature measuring element portion 1 of the thermistor is fitted in the minute gap put among the U-shaped segment conductors 3 and the odd-shaped segment conductor 11 adjacent thereto.

The conventional temperature measuring element portion described in patent document 1 is surrounded from the three sides thereof by the stator winding; however, one side is exposed to the outside of the stator winding. In contrast, the temperature measuring element portion 1 in the present embodiment is disposed so as to be surrounded from four sides by the stator winding. Thus, the temperature detection accuracy of the thermistor is improved and also ability to follow up a sudden change in the temperature of the stator winding is improved.

In FIG. 2, the temperature measuring element portion 1 of the thermistor is inserted from the opening 27 defined among the U-shaped segment conductors 3 and the odd-shaped segment conductor 11 connected to a transition portion. Alternatively, the temperature measuring element portion 1 of the thermistor may be inserted from an opening 27 defined among the U-shaped segment conductors 3 and each of the odd-shaped segment conductors 5, 7, 9, 13, 15, 17 in the stator coil end 36.

The temperature measuring element portion of the thermistor is fully embedded inside the stator coil end; therefore, it is surrounded from the four sides by the stator winding that produces heat. Thus, the temperature detection accuracy of the thermistor and ability to follow up the actual temperature of the stator winding can be improved.

The temperature measuring element portion of the thermistor is inserted from the opening defined among the U-shaped segment conductors and the odd-shaped segment conductor, so that the temperature measuring element portion of the thermistor is stably held by the stator winding having high rigidity. Accordingly, as the position of the temperature measuring element portion of the thermistor is stable and the temperature measuring element portion is in appropriate contact with the stator winding, a variation in detected temperature is hard to occur in each stator. In addition, after the temperature measuring element portion has been inserted, it is not needed to be secured by means of a lacing string or an adhesive. Thus, the temperature measuring element portion of the thermistor can be secured to the stator accurately and stably.

Since the stator winding generally has a large wire-diameter or is a rectangular wire, the gap that is defined among the U-shape segment conductors and the odd-shaped segment conductor and that receives the temperature measuring element portion of the thermistor inserted thereinto is relatively large and is stable in position. The temperature measuring element portion 1 of the thermistor can automatically be inserted by equipment or even manually inserted to improve workability.

With these configurations, the thermistor can be attached to the stator winding with a high degree of reliability.

The present embodiment can improve the temperature detection accuracy of the thermistor and ability to follow up a sudden change in the temperature of the stator winding.

Additionally, the temperature measuring element portion of the thermistor can be attached to the stator accurately and stably.

Further, the attachment work can be automated or its workability can be improved. As a result, the thermistor can be attached with a high degree of reliability.

A configuration of an electric rotating machine according to another embodiment of the present invention is next described with reference to FIGS. 7 and 8. Incidentally, the overall configuration of the electric rotating machine according to the present embodiment is the same as that illustrated in FIG. 1. The configuration of the stator used in the electric rotating machine according to the present embodiment is the same as that illustrated in FIG. 2.

Figure 7:
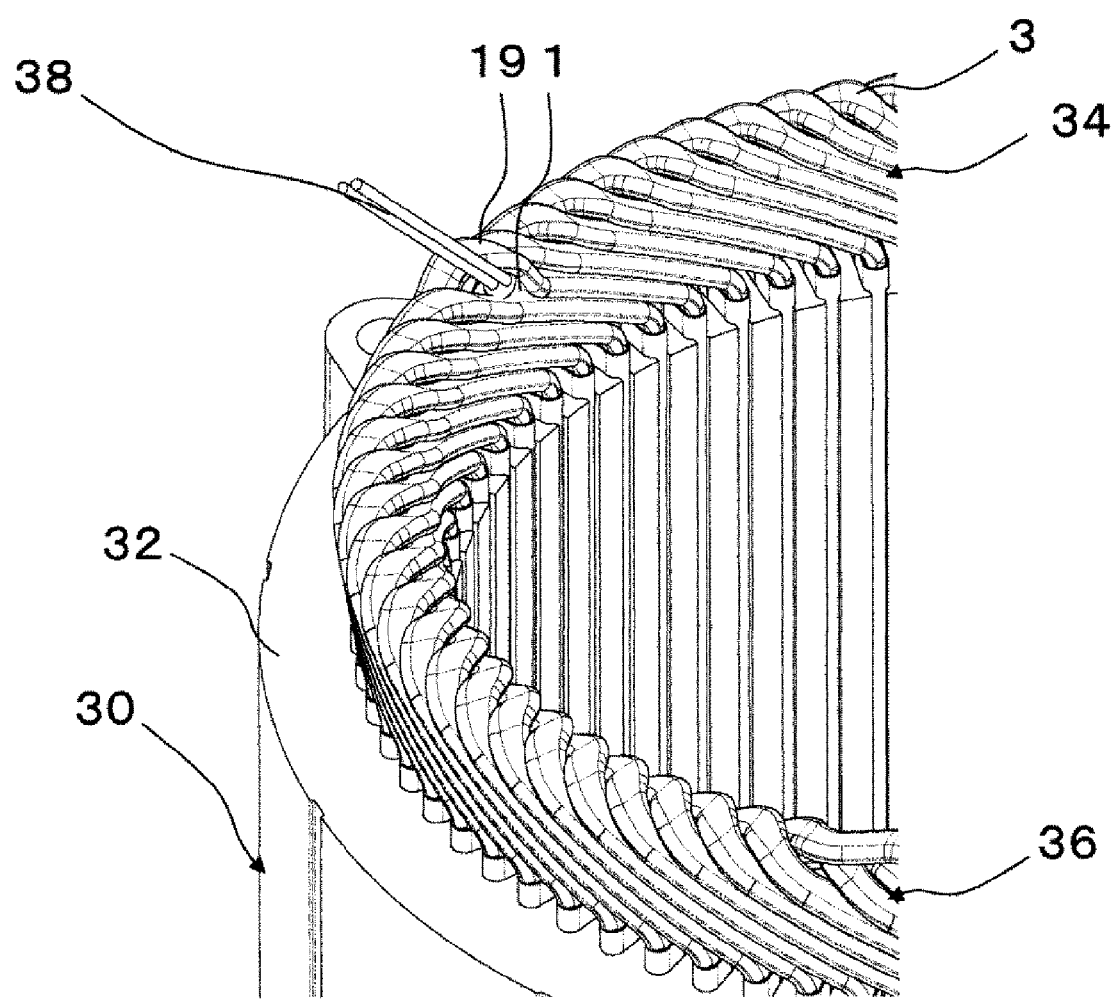
FIG. 7 is a partial enlarged perspective view illustrating a configuration of the stator used in the electric rotating machine according to another embodiment of the present invention.

FIG. 7 is a partial enlarged perspective view illustrating the configuration of the stator used in the electric rotating machine according to another embodiment of the present invention. FIG. 8 is a front view illustrating the configuration of a U-shaped segment conductor used in the stator of the electric rotating machine according to another embodiment of the present invention.

The example illustrated in FIG. 5 uses 72 of the U-shaped segment conductors 3. In contrast, the present embodiment uses 71 of the U-shaped segment conductors 3 and one odd- and U-shaped segment conductor 19 detailed with FIG. 8. Incidentally, the odd-shaped segment conductors 3, 5, 7, 9, 11, 13, 15, and 17 illustrated in FIG. 3 are used similarly to the first embodiment.

As illustrated in FIG. 7, a plurality of the U-shaped segment conductors 3 and the odd- and U-shaped segment conductor 19 are arranged in the slots of the stator core 32. The connecting portions of the U-shaped segment conductors 3 and the odd-shaped connecting portion of the odd- and U-shaped segment conductor 19 are arranged at the end portion of the stator core 32 to form a stator coil end 36.

A temperature measuring element portion 1 of a thermistor is inserted into the stator coil end 36 from an opening defined among the U-shaped segment conductors 3 and the odd- and U-shaped segment conductor 19 adjacent thereto. In this way, the temperature measuring element portion 1 of the thermistor is fitted in a minute gap sandwiched among the connecting portions 23 of the U-shaped segment conductors 3 and an odd-shaped connecting portion 25 of the odd- and U-shaped segment conductor 19 in the stator coil end 36.

Figure 8:
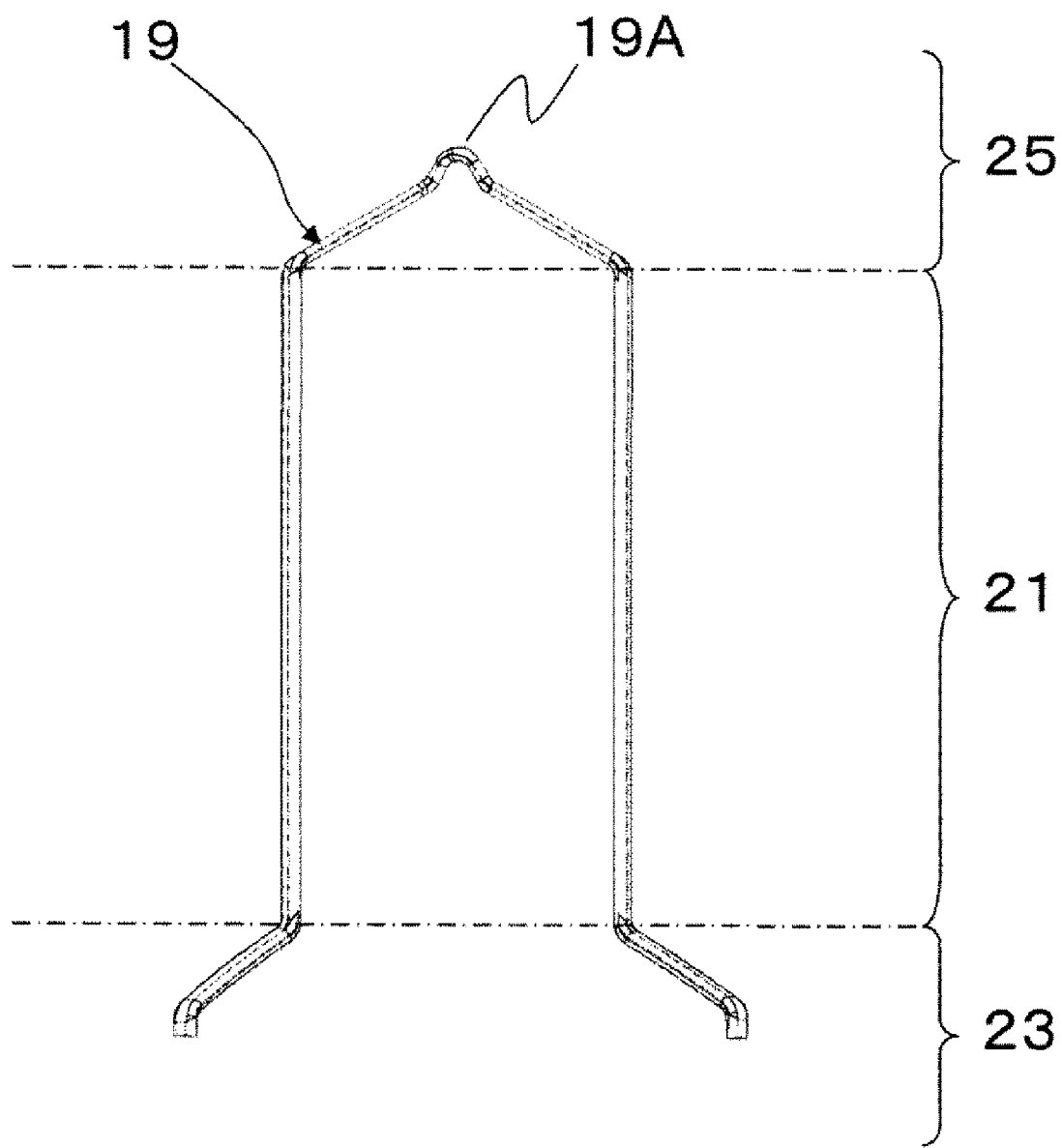
FIG. 8 is a front view illustrating a configuration of a U-shaped segment conductor used in the stator of the electric rotating machine according to another embodiment of the present invention.

As illustrated in FIG. 8, the odd- and U-shaped segment conductor 19 includes slot portions 21 received in two respective slots separate from each other in the stator core 32; connecting portions 23 for connecting the slot portions 21 at respective end portions; and an odd-shaped connecting portion 25 having a convex portion 19A and shaped differently from the upper connecting portion of the U-shaped segment conductor 3.

The temperature measuring element portion of the thermistor is fully embedded inside the stator coil end; therefore, it is surrounded from the four sides by the stator winding that produces heat. Thus, the temperature detection accuracy of the thermistor and ability to follow up the actual temperature of the stator winding can be improved.

The temperature measuring element portion of the thermistor is inserted from the opening defined among the U-shaped segment conductors and odd- and U-shaped segment conductor, so that the temperature measuring element portion of the thermistor is stably held by the stator winding having high rigidity. Accordingly, as the position of the temperature measuring element portion of the thermistor is stable and the temperature measuring element portion is in appropriate contact with the stator winding, a variation in detected temperature is hard to occur in each stator. In addition, after the temperature measuring element portion has been inserted, it is not needed to be secured by means of a lacing string or an adhesive. Thus, the temperature measuring element portion of the thermistor can be secured to the stator accurately and stably.

Since the stator winding generally has a large wire-diameter or is a rectangular wire, the gap that is defined among the U-shape segment conductors and the odd-shaped segment conductor and that receives the temperature measuring element portion of the thermistor inserted thereinto is relatively large and is stable in position. This enables the temperature measuring element portion 1 of the thermistor to be automatically inserted by equipment or to be even manually inserted to improve workability.

The present embodiment can improve the temperature detection accuracy of the thermistor and ability to follow up a sudden change in temperature of the stator winding.

The temperature measuring element portion of the thermistor can be attached to the stator accurately and stably.

Further, the attachment work can be automated, workability can be improved. As a result the thermistor can be attached with a high degree of reliability.

Incidentally, the temperature measuring element portions 1 of the thermistor illustrated in FIGS. 5 and 7 are each fitted in the minute gap sandwiched among the connecting portions of the segment conductors in the stator coil end. Besides this, the temperature measuring element portion 1 is secured with varnish. In this way, the temperature measuring element portion of the thermistor is fully embedded inside the stator coil end. Therefore, it is surrounded from the four sides by the stator winding that produces heat. In addition, heat transfer from the stator winding is improved owing to the varnish. Thus, the temperature detection accuracy of the thermistor and ability to follow up a sudden change in temperature of the stator winding can be improved.

EXPLANATION OF REFERENCE NUMERALS

1 . . . Temperature measuring element portion of thermistor
3 . . . U-shaped segment conductor
5 . . . Odd-shaped segment conductor (U-phase lead)
7 . . . Odd-shaped segment conductor (V-phase lead)
9 . . . Odd-shaped segment conductor (W-phase lead)
11 . . . Odd-shaped segment conductor (transition)
13 . . . Odd-shaped segment conductor (U-phase neutral point)
15 . . . Odd-shaped segment conductor (V-phase neutral point)
17 . . . Odd-shaped segment conductor (W-phase neutral point)
19 . . . Odd-shaped segment conductor
21 . . . Segment conductor slot portion
23 . . . Segment conductor connecting portion
25 . . . Segment conductor odd-shaped connecting portion
27 . . . Opening for inserting the temperature measuring element portion of the thermistor
30 . . . Stator 32 . . . Stator core
34 . . . Stator winding
36 . . . Stator coil end
38 . . . Thermistor
50 . . . Rotor
52 . . . Bearing
100 . . . Electric rotating machine

The invention claimed is:

1. An electric rotating machine comprising: a rotor mounted on a rotating shaft rotatably supported; and a stator disposed around an outer circumference of the rotor via a minute clearance between the rotor and the stator; the stator including a stator core having a plurality of slots formed in a circumferential direction, a stator winding formed by connecting a plurality of segment conductors inserted into the slots of the stator core, and a thermistor for measuring the temperature of the stator winding, and the stator winding including slot portions received in the slots, and connecting portions each of which connects end portions of the slot portions, wherein a temperature measuring element portion of the thermistor is fitted in a minute gap defined by the connecting portions of the segment conductors at a stator coil end, the stator coil end being formed by arranging a plurality of the segment conductors in the slots of the stator core to thereby form the connecting portions of the segment conductors at the end portion of the stator core, and the thermistor is separated from the connecting portions of the segment conductors only by dead air that defines the minute gap,
wherein the minute gap is defined by at least four connecting portions of the segment conductors that immediately surround the temperature measuring element portion of the thermistor.

2. The electric rotating machine according to claim 1, wherein the segment conductors includes:
a U-shaped segment conductor having a general U-shape which has slot portions received in two separate slots of the stator core and has connecting portions each of which connects end portions of the slot portions; and
an odd-shaped segment conductor which has a slot portion received in one of the slots and a connecting portion for connecting an end portion of the slot portion to a U-, V-, or W- lead terminal, a neutral point or a transition portion, the odd-shaped segment conductor being different in shape from the U-shaped segment conductor, and
wherein a plurality of the U-shaped segment conductors and of odd-shaped segment conductors are arranged in the slots of the stator core so that the connecting portions of the U-shaped segment conductors and the connecting portions of the odd-shaped segment conductors are arranged in the end portion of the stator core to form the stator coil end, and
the temperature measuring element portion of the thermistor is inserted into the stator coil end from an opening defined among the U-shaped segment conductors and the odd-shaped segment conductor adjacent thereto and is fitted into a minute gap defined among the connecting portions of the U-shaped segment conductors and the connecting portion of the odd-shaped segment conductor in the stator coil end.

3. The electric rotating machine according to claim 1, wherein the segment conductors includes:
a U-shaped segment conductor having a general U-shape which has slot portions received in two separate slots of the stator core and has connecting portions each of which connects end portions of the slot portions; and
an odd- and U-shaped segment conductor which has slot portions received in the two separate slots of the stator core and odd-shaped connecting portions each connecting end portions of the slot portions, the odd-shaped connecting portions being shaped convex and being different in shape from the connecting portions of the U-shaped segment conductor, and
wherein a plurality of the U-shaped segment conductors and of the odd- and U-shaped segment conductors are arranged in the slots of the stator core so that the connecting portions of the U-shaped segment conductors and the odd-shaped connecting portions of the odd- and U-shaped segment conductors are arranged in the end portion of the stator core to form the stator coil end, and
wherein the temperature measuring element portion of the thermistor is inserted into the stator coil end from an opening defined among the U-shaped segment conductors and the odd- and U-shaped segment conductor adjacent thereto and is fitted into a minute gap defined among the connecting portions of the U-shaped segment conductors and the connecting portion of the odd- and U-shaped segment conductor or a minute gap defined among the odd-shaped connecting portions in the stator coil end.

4. The electric rotating machine according to claim 2, wherein the temperature measuring element portion of the thermistor is secured by means of varnish in the minute gap sandwiched among the connecting portions of the segment conductors.

* * * * *